Patented Aug. 21, 1951

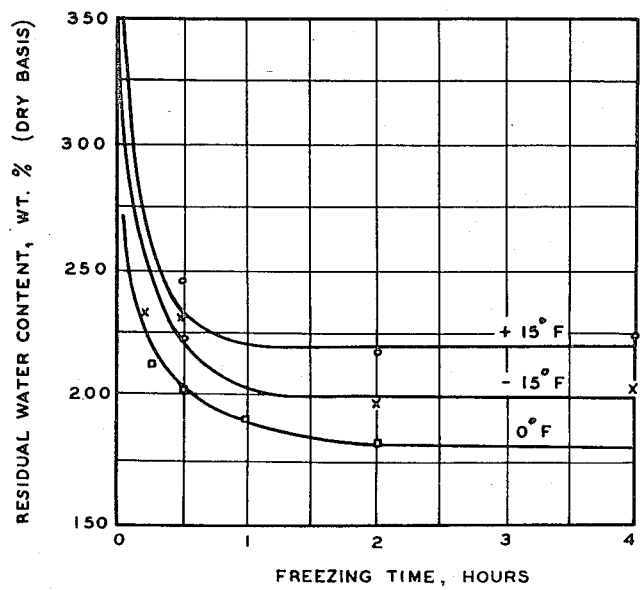
EFFECT OF FREEZING TIME AND TEMPERATURE ON RESIDUAL WATER CONTENT OF SILICA-ALUMINA HYDROGEL
ERNEST A. BODKIN
JOHN W. PAYNE
*INVENTORS*

2,564,776

UNITED STATES PATENT OFFICE 2,564,776

EXTRUSION OF A FROZEN AND THAWED HYDROGEL

Ernest A. Bodkin, Pitman, and John W. Payne, Woodbury, N. J., assignors to Socony-Vacuum Oil Company, Incorporated, a corporation of New York Application July 13, 1949, Serial No. 104,572

5 Claims. (Cl. 252—454)

The present invention relates to the preparation of inorganic oxide hydrogels and gelatinous precipitates in a condition suitable for extrusion and, more particularly, is directed to a process for preparing an extruded synthetic inorganic oxide gel composite containing a major proportion of silica.

Inorganic oxide gels have in the past found wide application as adsorbents, desiccants, catalysts, and suitable surfaces for the deposition thereon of various materials, particularly those of a catalytic nature. Experience has shown that while such gels may be employed in fragmentary form, they are suitably prepared for use in the above and similar operations in the form of substantially uniform particles. Various means have accordingly been adopted to render a hydrogel into a particle form of desired size and shape. Such means have included principally pelleting and extrusion operations.

The present invention is directed to an improvement in the latter operation and, more specifically, is concerned with the preparation of the hydrogel material to be extruded. According to this invention, a charge suitable for extrusion is prepared by the formation of a hydrogel, which, due to its method of preparation, inherently contains a small quantity of zeolitic alkali metal. The hydrogel is thereafter frozen and thawed under conditions of time and temperature to yield resulting granules of hydrogel while a major proportion of the water contained in the original hydrogel mass is released. The released water is removed from the hydrogel granules to give a product characterized by a sufficient degree of plasticity and moisture content so as to properly lubricate the dies of the extrusion apparatus. This procedure has several advantages over the usual processes of extruding hydrogel materials wherein the charge is necessarily kneaded or ball milled prior to extrusion in order to lend a proper consistency and plasticity to the mass to be extruded. The process of this invention accordingly represents a compact and efficient method for preparing an extrudable mass.

The hydrogel employed in preparing the extruded particles of this invention is a silica-containing hydrogel and suitably a composite comprising a major proportion of silica and a minor proportion of a hydrous inorganic metal oxide such as alumina, zirconia, titania, beryllia, ceria, thoria, manganese oxide, and the like. The hydrogel composites may be prepared by any of the methods commonly employed in the art. Thus, taking the preparation of a silica-alumina hydrogel as a typical example, such a composite may be synthesized by mixing soluble alkali metal silicates and soluble aluminum salts to yield a hydrosol containing silica and alumina, or a silica hydrogel and an alumina hydrogel may be separately prepared and the hydrogels mixed in wet condition. In the case of silica, a convenient method is to acidify a solution of an alkali metal silicate, yielding a silica hydrogel. In the case of alumina, the desired hydroxide may be precipitated by the addition of alkalis, particularly ammonium hydroxide, although other precipitants, such as ammonium carbonate, ammonium hydrosulfide, or ammonium sulfide, may be employed. Other conventional methods for preparing silica-containing gels previously employed in the art include the formation of a silica hydrogel, which is thereafter added to an aqueous solution of an aluminum salt and alumina precipitated in the presence of the suspended silica by the addition of alkaline precipitants. Also, separately precipitated alumina may be added to an alkali metal silicate and the gelation of silica may be brought about in the presence of the alumina by the addition of just the required amount of acid, which is insufficient to redissolve the alumina. The resulting composites, prepared by any of the aforementioned conventional procedures involving acidification or reaction of a solution of alkali metal silicate unavoidably contain a small quantity of zeolitic alkali metal, which cannot be removed from the composite upon washing with water. Inasmuch as sodium silicate comprises one of the more readily available raw materials for the manufacture of silica-containing composites, a hydrogel prepared therefrom inherently contains a small quantity of zeolitic sodium present as sodium oxide, generally in an amount of between about 1 and about 9 per cent by weight of hydrogel which has been washed free of water-soluble salts and dried.

A silica-containing hydrogel containing a small amount of zeolitic alkali metal, as above described, is prepared in form ready for extrusion by formation of the desired hydrogel, freezing said hydrogel, and thereafter thawing the frozen hydrogel to release a major proportion of water contained in said hydrogel. The released water is then removed from the residual hydrogel granules and said granules are thereafter subjected to extrusion. The extruded hydrogel may be cut into particles of desired length, dried and tempered at an elevated temperature or may undergo any other after-treatment to yield hard particles of silica-containing gel.

Silica-containing hydrogel is frozen in accordance with the present procedure by chilling in air or, preferably, by immersion in a cooling bath of a water-immiscible liquid, such as kerosene, maintained at a temperature below the freezing point of water and, preferably, below about 25° F. The minimum time required for the freezing operation will vary with the temperature of the freezing bath. It has been established that within the temperature range of from about −5° F. to about +5° F. and, preferably, at about 0° F., maximum removal of water is obtained from a silica-containing hydrogel having a small amount of zeolitic alkali metal incorporated therein.

After the hydrogel is frozen, it is removed from the freezing bath, drained free of liquid contained in the bath and thawed by heating to a temperature above the freezing point of water. The thawing may be accomplished by simply exposing the frozen hydrogel to room temperature or may be accelerated by heating the hydrogel with suitable means, such as live steam. The freezing and thawing operations cause the hydrogel to disintegrate into small granules and release a major proportion of the water originally present in the freshly formed hydrogel.

The water released from the hydrogel as a result of the thawing is removed by decantation, filtration or other suitable means and the residual hydrogel granules are centrifuged to remove additional liquid adhering to the surfaces.

The water content of the hydrogel granules so treated is an important factor, since the presence of either too much or too little water in the hydrogel charge subjected to extrusion results in poorly shaped, weak gel particles. The physical weakness of the particles appears to be caused by insufficient extrusion pressures in the first case and by the lack of sufficient plasticity and cohesion among the granules of the charge in the second case. The required water content of a hydrogel charge to extrusion depends to some extent upon the composition of the gel but will generally be between about 60 and about 85 per cent by weight of moisture.

The extrusion can be accomplished by employing either a hydraulic plunger type extruder or a continuous auger type extruder. When the latter is employed, it is desirable to mix with the charged hydrogel a lubricant such as oleic acid, castor oil, etc., to impart satisfactory extruding characteristics to the charge. While the size of the extruded material may be varied over wide extremes, for the present purpose, extrusion through a hydraulic extruder with a die having approximately ¼" diameter openings and cutting the resulting extruded material to particles of desired length was found to give a convenient and easily handled hydrogel product.

Where the extruded hydrogel particles are to be employed in catalytically promoting the conversion of hydrocarbons, the hydrogel should preferably be substantially freed from zeolitic alkali metal ions prior to drying and tempering the extruded hydrogel particles. To remove zeolitic alkali metal contained therein, the frozen and thawed hydrogel, prior to or after extrusion, may be base-exchanged with an acid or with a solution of a salt, the cation of which is capable of replacing zeolitic sodium. Thus, a frozen and thawed hydrogel composite consisting of silica and one or more hydrous metal oxides is suitably base-exchanged with an aqueous solution of an acid, an ammonium salt or a metal salt usually, although not necessarily, a salt of the metal whose oxide was used in preparing the hydrogel. For example, a silica-alumina hydrogel may be base-exchanged with an aqueous aluminum sulfate solution to remove zeolitic sodium contained in the hydrogel structure. Where the silica-containing hydrogel is to be used as a desiccant or for other purposes in which the presence of zeolitic alkali metal is not considered detrimental, the above described base exchange procedure may be omitted.

To produce a product of satisfactory hardness, the extruded hydrogel should be dried at a relatively low temperature, using large quantities of humidified air. The preferred procedure of this invention consists in drying the extruded hydrogel with air at a temperature of from about 70° F. to about 150° F., suitably at about 90° F. (dry bulb) and a relative humidity of about 30 per cent to about 80 per cent, suitably at about 70 per cent. The rate of circulation of air in the drying vessel will generally be between about 50 and about 300 and, preferably, about 100 cubic feet of air per minute per square foot of hydrogel cross sectional area. Under the above preferred conditions, approximately 80 per cent to 85 per cent of water in the hydrogel charged to the drying operation is removed, the time of drying requiring about 10 to 12 hours.

After drying, the extruded hydrogel particles are further heat treated at temperatures of the order of 1400° F. to impart additional physical hardness to the dried particles. A gradual heat treatment or tempering of the dried particles appears desirable and heat treatment is maintained at the maximum temperature for a period of about 10 hours. The extruded hydrogel particles, upon drying and tempering, shrink to about one-quarter of their original volume and it is though that this shrinkage largely accounts for the physical hardness of the finished product.

The following example will serve to illustrate the process of this invention without limiting the same:

*Example*

A silica-alumina hydrosol was prepared by mixing 1.00 volume of a solution of sodium silicate containing 157.0 grams of $SiO_2$ per liter and 1.00 volume of a solution containing 39.79 grams of aluminum sulfate and 30.51 grams of sulfuric acid per liter. The resulting colloidal solution was ejected from a nozzle in the form of globules into a column of gas oil whose depth was about 8 feet. The globules of solution fell through the oil and gelled before passing into a water layer located beneath the oil. The time of gelation for the concentrations and proportions of reactants given above was about 4 seconds. The spheroidal particles of hydrogel were conducted out of the bottom of the column into a stream of water. The solids composition of the resulting hydrogel was approximately 54.0 per cent by weight silica, 3.9 per cent by weight of alumina, and 3.4 per cent by weight of zeolitic sodium (present as sodium oxide).

The hydrogen particles were frozen by immersion in cold kerosene. The frozen hydrogel was then drained free of kerosene and thawed by heating to a temperature above 32° F. Freezing and thawing caused the hydrogel particles to disintegrate into small granules and to release a considerable portion of water originally present in the freshly formed hydrogel. The freezing of the hydrogel was carried out at temperatures of −15° F., 0° F., and +15° F. over periods varying between about 15 minutes and about 4 hours. The residual water content on a weight per cent dry basis of hydrogel particles, treated at each of the above-mentioned temperatures for varying freezing times, is set forth graphically in the attached drawing. In every instance, freezing at a temperature of 0° F. yielded a hydrogel having the lowest residual water content, establishing that maximum removal of water from the hydrogel containing zeolitic alkali metal is obtained by freezing the hydrogel at a temperature of about 0° F.

The water so released was decanted off and the residual hydrogel granules centrifuged in a basket-type centrifuge for 1½ minutes at about 3300 R. P. M. to give a hydrogel of 75-77 per cent by weight moisture content. The hydrogel was then extruded through a hydraulic extruder having a die of approximately ¼" diameter openings. The resulting spaghetti-like material was cut into particles approximately ¼" long.

The extruded hydrogel particles were dried at a temperature of 90° F. (dry bulb) and 70 per cent relative humidity by circulation of air through a 2" bed of the hydrogel particles at a rate of about 100 cubic feet per minute per square foot of hydrogel cross-sectional area. The drying time required to reach equilibrium was about 12 hours. At the end of this time, the resultant dried particles were tempered by heating in an electric furnace at the rate of 1° F. per minute until a temperature of 500° F. was reached and thereafter heating at a rate of 3° F. per minute until a temperature of 1400° F. was reached. The particles were held at this temperature for 10 hours and then permitted to cool, yielding hard, porous gel particles.

While the above example has illustrated the preparation of an extruded silica-alumina hydrogel, other inorganic oxide hydrogels containing a minor proportion of less than about 10 per cent by weight of zeolitic alkali metal may likewise be treated in accordance with the present procedure to yield hard extruded particles of silica-containing gel. Thus, silica, silica-zirconia, silica-thoria, silica-ceria, silica-beryllia, silica-manganese oxide, and similar hydrogel composites inherently containing a small quantity of zeolitic alkali metal, due to their method of preparation, may be treated in accordance with the process of the present invention. The ratio of silica to hydrous metal oxide employed may vary over a wide range. Thus, the alumina content of a silica-alumina hydrogel composite to be treated in accordance with the present invention may vary from about 3 per cent to about 18 per cent by weight on a bone dry basis. It will thus be understood that the method of this invention may be employed in preparing hard granules of inorganic oxide gel containing a major proportion of silica and formed from a hydrogel comprising a major proportion of silica and containing a small amount of zeolitic alkali metal unavoidably incorporated into the silica hydrogel by its method of preparation from an alkali metal silicate.

Although the present invention has been described with preferred embodiments, it is to be understood that modifications may be resorted to without departing from the spirit and scope thereof. The present invention is hence not to be unduly limited except as hereinafter defined by appended claims.

We claim:

1. A method for preparing hard granules of inorganic oxide gel containing a major proportion of silica, which comprises forming a hydrogel comprising a major proportion of silica by acidification of an alkali metal silicate solution, whereby zeolitic alkali metal ions are unavoidably incorporated into the silica-containing hydrogel, freezing said hydrogel at a temperature of about 0° F. to achieve maximum water removal therefrom, thawing the frozen hydrogel to produce a mass of shrunken hydrogel granules and an aqueous liquid, separating said aqueous liquid from said hydrogel granules, extruding said granules through a die and drying the extruded hydrogel.

2. A method for preparing hard granules of inorganic oxide gel containing a major proportion of silica, which comprises forming a hydrogel comprising a major proportion of silica and containing a minor proportion of zeolitic alkali metal, freezing said hydrogel at a temperature of about 0° F. to achieve maximum water removal therefrom by immersion in a water-immiscible cooling liquid, thawing the frozen hydrogel to produce a mass of shrunken hydrogel granules and an aqueous liquid, separating said aqueous liquid from said hydrogel granules, extruding said granules through a die and drying the extruded hydrogel.

3. A method for preparing inorganic oxide gel granules, which comprises forming a hydrogel comprising a major proportion of silica, a minor proportion of a hydrous inorganic metal oxide, and having incorporated therein a small amount of zeolitic alkali metal, freezing said hydrogel at a temperature of about 0° F. to achieve maximum water removal therefrom by immersion in a water-immiscible liquid, thawing the frozen hydrogel to produce a mass of shrunken granules of said hydrogel and an aqueous liquid, separating said aqueous liquid from said hydrogel granules, extruding said granules through a die and drying the extruded hydrogel.

4. A method for preparing inorganic oxide gel granules, which comprises forming a hydrogel comprising a major proportion of silica, a minor proportion of alumina, and containing a small amount of zeolitic alkali metal incorporated therein, freezing said hydrogel at a temperature of about 0° F. to achieve maximum water removal therefrom by immersion in a water-immiscible liquid, thawing the frozen hydrogel to produce a mass of shrunken granules of said hydrogel and an aqueous liquid, separating said aqueous liquid from said hydrogel granules, extruding said granules through a die and drying the extruded hydrogel.

5. A method for preparing hard granules of inorganic oxide gel containing a major proportion of silica and a minor proportion of a hydrous inorganic metal oxide, which comprises forming a hydrogel comprising a major proportion of silica, a minor proportion of a hydrous inorganic metal oxide and contaminated by the presence of a small amount of zeolitic alkali metal, freezing said hydrogel at a temperature of about 0° F. to achieve maximum water removal therefrom, thawing the frozen hydrogel to produce a mass of shrunken hydrogen granules and an aqueous liquid, separating said aqueous liquid from said hydrogel granules, extruding said granules through a die, drying and tempering the extruded material to yield a hard, porous adsorbent product.

ERNEST A. BODKIN.
JOHN W. PAYNE.

REFERENCES CITED

The following references are of record in the file of this patent:

UNITED STATES PATENTS

| Number | Name | Date |
|---|---|---|
| 2,480,669 | Payne et al. | Aug. 30, 1949 |

Certificate of Correction

Patent No. 2,564,776 　　　　　　　　　　　　　　　August 21, 1951

ERNEST A. BODKIN ET AL.

It is hereby certified that error appears in the printed specification of the above numbered patent requiring correction as follows:

Column 4, line 31, for "though" read *thought*; line 58, for "hydrogen" read *hydrogel*;

and that the said Letters Patent should be read as corrected above, so that the same may conform to the record of the case in the Patent Office.

Signed and sealed this 29th day of January, A. D. 1952.

[SEAL]

THOMAS F. MURPHY,
　　　　　　　　　　　　　　　　　　　*Assistant Commissioner of Patents.*